UNITED STATES PATENT OFFICE 2,448,370

SULFONATION OF AROMATIC COMPOUNDS IN PRESENCE OF ACETONITRILE

Donald S. Henderson, United States Navy, and Alexander N. Sachanen, Woodbury, N. J., assignors to Socony-Vacuum Oil Company, Incorporated, a corporation of New York No Drawing. Application November 18, 1944, Serial No. 564,174

4 Claims. (Cl. 260—505)

The present invention relates to the sulfonation of aromatic compounds and, more particularly, to the sulfonation of aromatic petroleum stocks.

The sulfonation of aromatic compounds to produce sulfonic acids is a well known reaction. The sulfonic acids so produced have many industrial uses, among which are the use of such sulfonic acids in the form of their metallic salts as detergents and wetting agents. The color of the metallic salts of these sulfonic acids is of prime importance in determining their commercial uses and often is directly related to the oxidation stability of the intermediate sulfonic acids. Sulfonation of aromatic compounds can be effected in many cases by direct reaction of the aromatic compounds and the sulfonating agent. However, the temperature required to effect the sulfonation reaction is often such that there is considerable decomposition of the sulfonic acids formed. With some compounds this decomposition can be reduced or eliminated by refrigeration. However, in the sulfonation of aromatic petroleum stocks several difficulties arise which are not encountered when sulfonating aromatic compounds in the absence of paraffinic compounds and alicyclic or naphthenic compounds.

When sulfonating aromatic compounds admixed with paraffinic or alicyclic compounds, intimate contact between the sulfonating agent and the aromatic compounds is only obtained with great difficulty. In other words, the aromatic compounds to be sulfonated tend to remain dissolved in the paraffinic and alicyclic compounds which form an oily phase which is to a substantial extent immiscible with the sulfonating agent. Agitation of the reaction mixture has not produced highly satisfactory results. On the other hand, when the reaction is carried out employing a solvent such as liquid sulfur dioxide which is a solvent not only for the aromatic compounds to be sulfonated but also for the conventional sulfonating agents, the desirable intimate contact between the material to be sulfonated and the sulfonating agent is obtained. However, the use of liquid sulfur dioxide as a solvent suffers from several deficiencies among which may be mentioned the well known fact that in the presence of relatively small amounts of moisture sulfur dioxide is very corrosive and the fact that the liquid sulfur dioxide must be removed or additional neutralizing agent is consumed with the concomitant loss of sulfur dioxide. Even when the sulfonation proces is carried out in such a manner that the liquid sulfur dioxide solvent is removed before the sulfonic acids produced in the reaction are neutralized it is necessary during or after neutralization to add a solvent for the sulfonic acids or their salts which is immiscible with the unreacted material and with the diluted sulfonating agent. It has been the practice in the past to remove the sulfur dioxide, then add a material such as isopropyl alcohol and permit the mixture of unsulfonated material, sulfonic acids and diluted sulfonating agent to separate into three layers. If a material such as isopropyl alcohol is not added, the reaction mixture separates into two layers comprising an upper oily layer of unsulfonated material and aromatic sulfonic acids dissolved therein and a lower layer of diluted sulfonating agent. When isopropyl alcohol or a similar material is added to the neutralized sulfonation mixture, the mixture separates into three layers, the upper one being the oily layer of unsulfonated material such as paraffinic and alicyclic compounds, an intermediate layer comprising an isopropyl alcohol solution of the metallic salt of the sulfonic acids together with a small amount of unsulfonated oily material, and a lower layer which is an aqueous solution of the metallic salt of the sulfonating agent.

For economic operation on the industrial scale it is necessary not only to recover the sulfur dioxide employed as a solvent but also to recover the isopropyl alcohol or similar material employed to separate the sulfonic acids from the unsulfonated material and the dilute sulfonating agent. Obviously this involves the provision of two separate recovery systems with the attendant capital cost, cost of maintenance, and labor. Consequently, this is a serious deficiency of processes involving the use of sulfur dioxide as a solvent in the sulfonation of aromatic compounds, particularly when admixed with oleaginous materials such as paraffin hydrocarbons and alicyclic hydrocarbons.

It has now been discovered that the sulfonation of aromatic compounds, and particularly the aromatic compounds of aromatic petroleum stocks, can be performed in the presence of the non-aromatic constituents of the stock and in the presence of a substantially non-sulfonatable organic material. This material is not only a solvent for the aromatic compounds to be sulfonated but also for conventional sulfonating agents and, in addition, is a good solvent for metallic salts of the aromatic sulfonic acids. Consequently, it can be used as an extracting medium for the separation of the metallic salts of the aromatic sulfonic acids when separating such salts from unsulfonated oily material and the aqueous solution of the metallic salt of the sulfonating agent. In addition, these novel solvents and extracting agents do not react to any appreciable extent wtih conventional neutralizing agents and, therefore, need not be removed from the reaction mixture before neutralization of the aromatic sulfonic acids as is necessary when sulfur dioxide is employed as a solvent.

It is an object of the present invention to provide a means for sulfonating aromatic compounds with conventional sulfonating agents in the presence of a solvent extractor immiscible with liquid paraffinic and alicyclic hydrocarbons and substantially unsulfonatable under the conditions of the reaction. It is another object of the present invention to provide a process for sulfonating aromatic hydrocarbons when admixed with paraffinic and alicyclic hydrocarbons employing nitriles of aliphatic and/or aromatic hydrocarbons. It is a further object of the present invention to sulfonate aromatic hydrocarbons to aromatic sulfonic acids in the presence of at least one solvent selected from the group consisting of aliphatic and aromatic nitriles, to neutralize the sulfonic acids in the presence of said nitrile and to employ said nitrile as a means for separating the metallic salts so obtained from unsulfonated material and the metallic salt of the sulfonating agent. The present invention also contemplates the provision of a novel wetting agent or detergent produced by sulfonating aromatic compounds in a liquid medium comprising at least one aliphatic or carbocyclic nitrile which is substantially unsulfonated under the conditions of the reaction.

In a general sense, the present invention involves sulfonating an aromatic compound in the presence of at least one aliphatic or carbocyclic nitrile in sufficient amount to hold substantially all of the aromatic compound to be sulfonated in solution and also to keep in solution substantially all of the sulfonating agent whereby the sulfonating agent and the aromatic compound to be sulfonated are brought into intimate contact in what is for the purposes of the reaction a single phase in contradistinction to the plurality of phases which have existed in sulfonating reactions not employing sulfur dioxide as a solvent. The preferable solvent is acetonitrile and the reaction may be carried out at any suitable temperature between about minus 20° C. to about plus 70-80° C. employing any of the conventional sulfonating agents such as 94-100 per cent sulfuric acid, oleum in the usual concentrations up to about 68 per cent oleum, chlorosulfonic acid and the like. After the sulfonation reaction is complete the reaction mixture is diluted sufficiently with water to substantially eliminate further sulfonation. (This is known in the art as quenching.) The quenched mixture is then allowed to stand when desirable to separate into two layers. The upper layer containing the unreacted oil, most of the sulfonic acids and most of the nitrile, and the lower layer containing the dilute sulfuric acid, a small amount of sulfonic acids and a small amount of nitrile. However, it is preferred in many instances to neutralize the reaction mixture to a pH of about 8 with relatively strong aqueous solution of an alkaline hydroxide, for example, and about 15 per cent to about 50 per cent sodium hydroxide solution. The neutralized mixture on standing separates into three layers comprising an upper layer of unreacted oil, a middle or intermediate layer comprising a nitrile solution of the metallic sulfonates, some metallic sulfate and a small amount of unreacted material, and a bottom layer containing the major portion of the metallic sulfate, small amounts of the metallic sulfonates and a small amount of the nitrile. The three layers are then separated and the middle layer treated to recover the major portion of the metallic sulfonates. When desirable the small amount of nitrile and metallic sulfonates may be recovered from the bottom layer.

The metallic sulfonates are separated from the nitrile in any suitable manner, for example, when acetonitrile is employed it may be diluted with two to three volumes of water and the aqueous solution of acetonitrile and metallic sulfonates distilled. In such a method of separation advantage is taken of the fact that acetonitrile forms an azeotrope with water and can be readily separated from the metallic sulfonates by azeotropic distillation.

The present process may be employed with particularly satisfactory results when the sulfonation of aromatic compounds of an aromatic petroleum stock is required. Separation of the aromatic compounds from the non-aromatic compounds, i. e. aliphatic and alicyclic hydrocarbons, is unnecessary and the petroleum stock comprising a mixture of the aromatic and non-aromatic compounds may be sulfonated directly employing at least one aliphatic or aromatic nitrile as a solvent. The nitriles employed as a solvent are substantially unsulfonatable under the conditions of the reaction and, in addition, are excellent solvents for the aromatic compounds and conventional sulfonating agents whereas aliphatic and alicyclic hydrocarbons are substantially insoluble in the nitriles. As a consequence, the reaction may be envisioned as involving extraction of the aromatic compounds from the petroleum stock to form a solution of aromatic compounds in a nitrile in which the sulfonating agent likewise is soluble. Consequently, the sulfonation takes place in a homogeneous single phase in contradistinction to conventional sulfonating processes wherein the aromatic compounds are dissolved in an oily medium comprising aliphatic and/or alicyclic hydrocarbons as one phase and the sulfonating agent forms a second phase. In other words, sulfonation of aromatic hydrocarbons as heretofore carried out in the petroleum industry (exclusive of the sulfur dioxide process) has been a reaction carried out in a heterogeneous system comprising at least two phases.

Illustrative of the principles of the present invention but by no means limiting them are the following illustrative examples which are provided for the guidance of those skilled in the art. An aromatic petroleum stock derived from coastal crudes containing about 20 per cent to about 30 per cent aromatic hydrocarbons boiling within the range of 275° C. to about 385° C. was sulfonated employing 60 per cent oleum. The aromatic stock had the following characteristics:

| | | |
|---|---|---|
| Gravity | °A. P. I. | 25.7 |
| Pour point | °F | —40 |
| Flash point | °F | 270 |
| Fire point | °F | 300 |
| Viscosity @— | | |
| 100° F | seconds | 54/57 |
| 130° F | do | 45 |
| 210° F | do | 35 |
| Color (Lovibond) | | 5 |

EXAMPLE I 100 parts by volume (85 parts by weight) of the aforementioned aromatic stock was mixed with 200 parts by volume (157 parts by weight) of acetonitrile and were placed in a closed container fitted with a mechanical stirrer, a reflux condenser and a valved inlet for the introduction of sulfonating agent and the like. The container was placed in an ice bath and the temperature of the bath held at about 10° C. throughout the reaction. 12 parts by volume (24 parts by weight) of 60 per cent oleum were added slowly with constant stirring. The addition of the sulfonating agent required about 30 minutes. The reaction was allowed to proceed for about 15 minutes after the last of the oleum had been added, thereafter the reaction was quenched by the addition of about 75 parts by volume of water which was sufficient to dilute the sulfuric acid to a concentration (approximately 30 per cent $H_2SO_4$) at which no more sulfonation would occur. The quenched reaction mixture was then neutralized to a pH of about 8 by the addition of strong aqueous caustic soda solution, i. e. a 48 per cent sodium hydroxide and an additional 100 parts by volume of water were added to the neutralized quenched mixture. After the agitation was stopped the quenched neutralized mixture separated into three layers, the upper layer containing unreacted oil, the middle layer containing the acetonitrile solution of the sodium salts of the aromatic sulfonic acids, i. e. sodium sulfonates, some sodium sulfate and a small almost negligible amount of unreacted oil. The bottom layer contained substantially all of the sodium sulfate, small amounts of sodium sulfonates, and a small amount of acetonitrile. The lower layer of the mixture contained about 5 per cent of the acetonitrile employed.

The sodium salts of the aromatic sulfonic acids contained in the acetonitrile layer were separated from the acetonitrile and water by evaporating the aqueous acetonitrile solution of the sodium salts to the point where all of the acetonitrile and some water had been removed. The residue was then dried drop-wise on a drum drier. Those skilled in the art will appreciate that other methods of separating the sodium sulfonates from the aqueous nitrile layer may be employed, for example the solution may be spray-dried.

The sodium sulfonates so obtained were subjected to "Draves wetting tests" described in the Yearbook of the American Association of Textile Chemists and Colorists (1931, 1932 and 1937) at 0.5 per cent, 0.25 per cent and 0.125 per cent concentration of the dried product.

As those skilled in the art know, the "Draves test" is a standard test for determining wetting power. The test consists essentially of suspending a skein of cotton yarn in an aqueous solution of the wetting agent and measuring the time it takes for the skein to sink. The skein is made of 40/2 gray, unboiled cotton yarn. It should weigh $5.0 \pm 0.05$ grams and should be 8 to 9 inches long when doubled. For the test the yarn is cut through at one end of the skein and a hook weighing 0.5 gram is attached at the other end. The hook is attached to a sinker weighing 20 grams by a thread approximately 1½ inches long. When the skein is first dropped into the solution of the wetting agent, the air adsorbed on the yarn will cause it to be suspended vertically holding the thread between the hook and the sinker taut. When the skein has become wet the thread will sag as the skein sinks to the bottom. The wetting time is defined as the time elapsed between the time the sinker strikes the bottom and the time the first sag in the thread is noticed. Usually the test is run on ½, ¼, and ⅛ per cent solutions of the wetting agent. Five determinations are made at each concentration and the average is taken as the wetting time. Any readings found to be more than 20–30 per cent from the average are considered to be due to other factors and are discarded. If the logarithm of the wetting time is plotted against the logarithm of the concentration in grams/liter the plot should be a straight line and from the plot the concentrations required to wet in 10 to 25 seconds can be taken. It is these concentrations which are usually reported.

*Draves test on crude product*

| Concentration Wetting Agent, per cent | 0.5 | 0.25 | 0.125 |
|---|---|---|---|
| Average Wetting Time, seconds | 3.4 | 13.8 | 66.3 |

Concentration to wet in 10 seconds=2.99 g/l.
Concentration to wet in 25 seconds=1.95 g/l.

The crude product was extracted with absolute ethyl alcohol. The extract was evaporated and dried.

*Draves test on purified product*

| Concentration Wetting Agent, per cent | 0.5 | 0.25 | 0.125 |
|---|---|---|---|
| Average Wetting Time, seconds | 2.7 | 9.5 | 46.3 |

Concentration to wet in 10 seconds=2.56 g/l.
Concentration to wet in 25 seconds=1.64 g/l.

The foregoing "Draves tests" are indicative that sulfonates produced by the present process are superior even to sulfonates prepared from similar aromatic petroleum stocks by a process involving the use of sulfur dioxide as a solvent. Thus, for example, whereas the sodium sulfonates produced as described hereinbefore require a concentration of 2.56 grams per liter to wet in 10 seconds and a concentration of 1.64 grams per liter to wet in 25 seconds, sodium sulfonates produced from similar aromatic petroleum stocks by a process involving the use of sulfur dioxide as a solvent require the concentration indicated in the following tabulation:

| Charge [1] No. | Conc. to Wet in 10 Seconds | Conc. to Wet in 25 Seconds |
|---|---|---|
| 1 | 2.91 | 1.85 |
| 2 | 3.25 | 1.93 |
| 3 | 3.87 | 2.14 |
| 4 | 3.18 | 1.91 |

[1] All charge stocks were transformer oil distillates from coastal crudes.

EXAMPLE II 102 parts by volume (88 parts by weight) of the same aromatic petroleum stock were mixed with 200 parts by volume (157 parts by weight) of acetonitrile and sulfonated with 12 parts by volume (24 parts by weight) of 60 per cent oleum. The temperature of the reaction was maintained at about 10° C. and the sulfonating agent was added slowly during the course of about 30 minutes. After the reaction had reached completion the reaction mixture was neutralized with strong aqueous caustic soda solution containing about 48 per cent sodium hydroxide. To the neutralized solution 125 parts by volume of water were added. The diluted reaction mixture was then stratified into three layers, the lower brine layer was washed with acetonitrile to remove any sulfonates which were dissolved therein. The intermediate or acetonitrile layer was washed once with a solvent for aliphatic and alicyclic hydrocarbons, i. e. petroleum ether, to remove any residual oil. The acetonitrile layer was then worked up as described hereinbefore and the sodium sulfonates subjected to the standard "Draves test" at 0.5 per cent and 0.25 per cent concentration. The average wetting time for the sodium sulfonates thus obtained at 0.5 per cent concentration was 3.6 seconds and at 0.25 per cent concentration 14.8 seconds. From these values it can be calculated that the concentration of the sodium sulfonates so produced to wet in 10 seconds is 3.02 grams per liter and the concentration to wet in 25 seconds is 1.94 grams per liter.

EXAMPLE III 1,000 parts by volume (850 parts by weight) of an aromatic petroleum stock were mixed with 2,000 parts by volume (1,566 parts by weight) of acetonitrile. The material was sulfonated by slowly adding 120 parts by volume (235 parts by weight) of 60 per cent oleum while maintaining the reaction mixture at about 10° C. After the desired sulfonation had been completed the reaction mixture was quenched in the usual manner and the quenched mixture neutralized to about pH 8 with strong aqueous caustic soda solution. The neutralized quenched mixture was then stratified and the middle or acetonitrile layer separated. The upper or oily layer was extracted with about 200 parts by volume of 50 per cent aqueous solution of acetonitrile to remove any sulfonates which may have been held in the oily layer. The acetonitrile solutions were then worked up as described hereinbefore to obtain dry sodium salts of the aromatic sulfonic acids, i. e. sodium sulfonates. When these salts were subjected to the standard "Draves test" the average wetting time for concentration of 0.5 per cent, 0.25 per cent and 0.125 per cent were as tabulated hereinafter:

*Draves test on crude product*

| Concentration Wetting Agent, per cent | 0.5 | 0.25 | 0.125 |
|---|---|---|---|
| Average Wetting Time, seconds | 4.2 | 17.5 | 51.9 |

From the foregoing data it can be calculated that the concentration of sodium sulfonates so produced to wet in 10 seconds is 3.18 grams per liter and to wet in 25 seconds 1.88 grams per liter. The crude product was extracted with absolute ethyl alcohol and the purified product evaluated by the "Draves test." The following data was obtained from these "Draves tests":

*Draves test on purified product*

| Concentration Wetting Agent, percent | 0.5 | 0.25 | 0.125 |
|---|---|---|---|
| Average Wetting Time, seconds | 3.9 | 14.4 | 64.4 |

From the foregoing data it can be calculated that the concentration to wet in 10 seconds is 3.02 grams per liter and the concentration to wet in 25 seconds is 1.95 grams per liter.

It is desirable to emphasize, as has been pointed out hereinbefore, that acetonitrile is a selective solvent for aromatic hydrocarbons. Aliphatic and alicyclic hydrocarbons are almost completely insoluble in acetonitrile. Sulfonating agents, such as sulfuric acid in the conventional sulfonating strength, are likewise completely soluble in acetonitrile. Consequently, when sulfonating the aromatic hydrocarbons contained in a mixture of aromatic hydrocarbons, aliphatic hydrocarbons and alicyclic hydrocarbons such as occur in the petroleum industry and are known as aromatic petroleum stocks, the sulfonation of the aromatic hydrocarbons takes place in the acetonitrile phase. Other nitriles such as propionitrile, n-butyronitrile, n-valeronitrile, n-capronitrile, and benzonitrile generally are not completely satisfactory solvents for the sulfonation of aromatic hydrocarbons admixed with aliphatic and alicyclic hydrocarbons. All of these latter nitriles are miscible with the non-aromatic constituents of such a mixture as aromatic petroleum stocks. In addition, some of them react violently with sulfuric acid at room temperature. Thus, for example, propionitrile reacts violently with 98 per cent sulfuric acid at room temperature with the evolution of much heat and the formation of a crystalline substance. Benzonitrile also reacts with 98 per cent sulfuric acid at room temperature although the reaction is not as violent as that of the propionitrile. Under proper conditions, however, these side reactions can be controlled and minimized.

Sulfonation of the aromatic hydrocarbons of aromatic petroleum stock can be carried out employing nitriles other than acetonitrile such as propionitrile and benzonitrile, but the product obtained even after purification is not comparable with that obtained employing acetonitrile. Thus, for example, the purified sulfonates obtained by sulfonating transformer oil distillate from a Coastal crude employing propionitrile and 60 per cent oleum when subjected to the "Draves test" provided the following data:

| Concentration Wetting Agent, per cent | 0.5 | 0.25 | 0.125 |
|---|---|---|---|
| Average Wetting Time, seconds | 23.6 | 246.3 | +300 |

Concentration to wet in 10 seconds=9.05 g/l.
Concentration to wet in 25 seconds=5.10 g/l.

A similar stock sulfonated with 60 per cent oleum employing benzonitrile as the solvent provided a purified product which was likewise subjected to the "Draves test" with the following results:

*Draves test on the purified product*

| Concentration Wetting Agent, per cent | 0.5 | 0.25 | 0.125 |
|---|---|---|---|
| Average Wetting Time, seconds | 17.9 | 71.0 | +300 |

Concentration to wet in 10 seconds=6.67 g/l.
Concentration to wet in 25 seconds=4.21 g/l.

We claim:

1. A method for sulfonating aromatic hydrocarbons in admixture with aliphatic and alicyclic hydrocarbons which comprises mixing a hydrocarbon mixture containing aromatic, aliphatic and alicyclic hydrocarbons with a sulfonating agent and an amount of acetonitrile sufficient to dissolve substantially all of said aromatic hydrocarbons and to hold substantially all of said sulfonating agent in solution, maintaining said reaction mixture at sulfonation temperatures to obtain sulfonated aromatic hydrocarbons, quenching said mixture containing sulfonated aromatic hydrocarbons, stratifying said mixture to obtain a layer comprising acetonitrile and said sulfonated aromatic hydrocarbons, separating said acetonitrile layer from the quenched mixture and recovering sulfonated aromatic hydrocarbons therefrom.

2. A method for sulfonating aromatic hydrocarbons admixed with aliphatic and alicyclic hydrocarbons which comprises mixing a sulfonating agent, a hydrocarbon mixture containing aliphatic, alicyclic and aromatic hydrocarbons and sufficient acetonitrile to dissolve substantially all of said aromatic hydrocarbons and to hold substantially all of said sulfonating agent in solution, maintaining said mixture at sulfonating temperatures to obtain sulfonated aromatic hydrocarbons, quenching said mixture, neutralizing said mixture, stratifying said neutralized mixture to obtain a layer comprising acetonitrile and salts of said sulfonated aromatic hydrocarbons, separating said layer comprising acetonitrile and salts of sulfonated aromatic hydrocarbons and recovering said salts of sulfonated aromatic hydrocarbons.

3. In the process for sulfonating aromatic hydrocarbons which comprises causing a sulfonating agent and an aromatic hydrocarbon to react upon each other in the presence of a solvent in which said aromatic hydrocarbon and the sulfonated product are soluble but the sulfuric acid is not appreciably soluble and withdrawing the sulfonated product extracted in said solvent, the improvement which comprises reacting said aromatic hydrocarbon and said sulfonating agent in the presence of acetonitrile which is a solvent not only for said aromatic hydrocarbon, the sulfonated aromatic hydrocarbon and the alkali metal salts of the sulfonated aromatic hydrocarbon but is also a solvent for the sulfonating agent.

4. The method for sulfonating aromatic hydrocarbons of an aromatic petroleum stock containing from about 20 per cent to about 30 per cent of aromatic hydrocarbons and having a boiling range from about 275° C. to about 385° C., which comprises mixing a sulfonating agent, said aromatic petroleum stock and an amount of acetonitrile sufficient to dissolve substantially all of said aromatic hydrocarbons and to hold substantially all of said sulfonating agent in solution, maintaining said reaction mixture at sulfonation temperatures to obtain sulfonated aromatic hydrocarbons, quenching said mixture containing sulfonated aromatic hydrocarbons, stratifying said mixture to obtain a layer comprising acetonitrile and said sulfonated aromatic hydrocarbons, separating said acetonitrile layer from the quenched mixture and recovering sulfonated aromatic hydrocarbons therefrom.

DONALD S. HENDERSON.
ALEXANDER N. SACHANEN.

REFERENCES CITED

The following references are of record in the file of this patent:

UNITED STATES PATENTS

| Number | Name | Date |
| --- | --- | --- |
| 1,247,499 | Bull | Nov. 20, 1917 |
| 1,459,081 | Barbet | June 19, 1923 |
| 1,708,103 | Marx | Apr. 9, 1929 |
| 1,830,320 | Hessle | Nov. 3, 1931 |
| 1,899,969 | Kurtz | Mar. 7, 1933 |
| 1,934,216 | Tinker | Nov. 7, 1933 |
| 1,981,337 | Stoesser | Nov. 20, 1934 |
| 2,004,546 | Wulff | June 11, 1935 |
| 2,149,661 | Brandt | Mar. 7, 1939 |
| 2,149,662 | Brandt | Mar. 7, 1939 |
| 2,214,379 | Moser | Sept. 10, 1940 |
| 2,283,199 | Flett | May 19, 1942 |
| 2,358,773 | Blumer | Sept. 26, 1944 |
| 2,358,774 | Blumer | Sept. 26, 1944 |
| 2,365,638 | Hennion | Dec. 19, 1944 |

FOREIGN PATENTS

| Number | Country | Date |
| --- | --- | --- |
| 146,427 | Great Britain | Oct. 3, 1921 |
| 439,621 | Great Britain | Dec. 11, 1935 |

OTHER REFERENCES

Sidgwick, "The Organic Chemistry of Nitrogen," (1937), pages 139–140.

Kalichevsky, "Modern Methods of Refining Lubricating Oils," (1938), pages 134–135.

Ferris et al., "Ind. & Eng. Chem.," vol. 23, pages 753–761.

Degering, "An Outline of Organic Nitrogen Compounds," (1945), page 508.